US010468940B2

(12) United States Patent
Li et al.

(10) Patent No.: US 10,468,940 B2
(45) Date of Patent: Nov. 5, 2019

(54) MOTOR AND STATOR THEREOF

(71) Applicant: Johnson Electric S.A., Murten (CH)

(72) Inventors: Min Li, Shenzhen (CN); Kok Ang Chong, Hong Kong (CN); Xiao Lin Zhang, Shenzhen (CN); Hai Yang Wang, Shenzhen (CN); Moola Mallikarjuna Reddy, Shenzhen (CN)

(73) Assignee: Johnson Electric International AG, Murten (CH)

( * ) Notice: Subject to any disclaimer, the term of this patent is extended or adjusted under 35 U.S.C. 154(b) by 150 days.

(21) Appl. No.: 15/471,461

(22) Filed: Mar. 28, 2017

(65) Prior Publication Data

US 2017/0279331 A1 Sep. 28, 2017

(30) Foreign Application Priority Data

Mar. 28, 2016 (CN) .......................... 2016 1 0182573

(51) Int. Cl.
| | |
|---|---|
| *H02K 5/22* | (2006.01) |
| *H02K 11/20* | (2016.01) |
| *H02K 11/215* | (2016.01) |
| *H02K 21/14* | (2006.01) |
| *H02K 21/22* | (2006.01) |

(52) U.S. Cl.
CPC ........... *H02K 5/225* (2013.01); *H02K 11/215* (2016.01); *H02K 21/14* (2013.01); *H02K 21/22* (2013.01)

(58) Field of Classification Search
CPC ........ H02K 1/141; H02K 21/14; H02K 5/225; H02K 11/00; H02K 19/04; H02K 29/00; H02K 29/08; F04D 13/06

USPC ....... 310/71, 162, 194, 68 C, DIG. 3, DIG. 6
See application file for complete search history.

(56) References Cited

U.S. PATENT DOCUMENTS

| | | | | |
|---|---|---|---|---|
| 4,112,405 A | * | 9/1978 | Joseph ................. | H01F 27/402 310/68 C |
| 4,251,911 A | * | 2/1981 | Reynolds ............... | H01F 41/10 29/418 |
| 4,600,864 A | * | 7/1986 | Sato ....................... | H02K 29/08 310/156.12 |

(Continued)

FOREIGN PATENT DOCUMENTS

| | | |
|---|---|---|
| CN | 202840887 U | 3/2013 |
| EP | 394913 A1 * 10/1990 | ............... H01F 5/02 |

(Continued)

OTHER PUBLICATIONS

IdearHanyu website, Sep. 2011 Product 25, 3 pages. http://www.idearhanyu.com/cn/chanpin/tsdj/2011/0927/49.html (Year: 2011).*

*Primary Examiner* — Burton S Mullins
(74) *Attorney, Agent, or Firm* — Muncy, Geissler, Olds & Lowe, P.C.

(57) ABSTRACT

A motor includes a stator core, a winding bracket mounted around the stator core, a winding wound around the winding bracket, and a rotor cooperating with stator core. The winding bracket comprises a first bracket and a second bracket arranged in parallel with each other. The motor further includes a first connecting terminal and a second connecting terminal for supplying power to the winding from an external power source, and the first connecting terminal and the second connecting terminal are both mounted on the second bracket.

15 Claims, 15 Drawing Sheets

(56) References Cited

U.S. PATENT DOCUMENTS

| | | | | |
|---|---|---|---|---|
| 5,767,606 A * | 6/1998 | Bresolin | ............... | H02K 5/1285 310/162 |
| 6,046,522 A * | 4/2000 | Ko | ........................ | H02K 7/1185 192/45.005 |
| 6,326,879 B1 * | 12/2001 | Hangmann | ........... | H01H 37/043 310/68 C |
| 6,744,160 B2 * | 6/2004 | Piovesan | ................... | H02K 5/22 310/68 C |
| 6,975,049 B2 * | 12/2005 | Ionel | ........................ | H02K 1/143 310/49.01 |
| 7,038,570 B2 * | 5/2006 | McMichael | ............ | H01F 27/402 310/68 C |
| 8,475,136 B2 * | 7/2013 | Jayanth | .................. | F04C 23/008 310/68 C |
| 8,624,451 B2 * | 1/2014 | Shi | ............................ | H02K 5/08 29/596 |
| 9,293,966 B2 * | 3/2016 | Marioni | .................... | H02K 9/22 |
| 2006/0145559 A1 * | 7/2006 | Kopac | ..................... | H02K 29/12 310/184 |
| 2009/0039723 A1 * | 2/2009 | Marioni | ................ | H02K 21/185 310/152 |
| 2015/0326087 A1 * | 11/2015 | Wang | ...................... | F04D 13/06 417/423.7 |

FOREIGN PATENT DOCUMENTS

| | | | | |
|---|---|---|---|---|
| EP | 610826 A2 * | 8/1994 | ............. | F04D 29/04 |
| EP | 1052764 A1 * | 11/2000 | ................. | H02P 1/46 |
| EP | 1261101 A2 * | 11/2002 | ................. | H02K 1/14 |
| EP | 01601080 * | 11/2005 | ............. | H02K 1/143 |
| EP | 1601080 A1 * | 11/2005 | ................. | H02K 1/14 |
| EP | 1760859 A1 * | 3/2007 | ................. | H02K 1/14 |
| EP | 3032719 A1 * | 6/2016 | ............. | H02K 21/18 |
| JP | 2001-258226 * | 9/2001 | ............. | H02K 21/18 |
| WO | WO 0145235 A1 * | 6/2001 | ............. | H02K 21/14 |
| WO | WO 2015115098 A1 * | 6/2015 | ............. | H02K 21/18 |

* cited by examiner

MOTOR AND STATOR THEREOF

CROSS REFERENCE TO RELATED APPLICATIONS

This non-provisional patent application claims priority under 35 U.S.C. § 119(a) from Patent Application No. 201610182573.X filed in The People's Republic of China on 28 Mar. 2016.

FIELD OF THE INVENTION

This invention relates to a motor and a stator of the motor.

BACKGROUND OF THE INVENTION

Permanent magnet synchronous motors are typically used in drain pumps and circulating pumps for dishwashers or washing machines. Stator of the motor usually includes a U-shaped stator core and a winding bracket having two brackets arranged in parallel with each other and respectively sleeved on two branches of the U-shaped stator core. Conventionally, such a motor is connected with an external power source through two connecting terminals respectively disposed on two brackets of the winding bracket.

SUMMARY OF THE INVENTION

The present invention aims to provide a stator with a new arrangement for the winding bracket.

In one aspect, a stator is provided which includes a stator core, a winding wound around the stator core, and a winding bracket disposed between the stator core and the winding. The winding bracket comprises a first bracket and a second bracket arranged in parallel with each other. The stator further comprises a first connecting terminal and a second connecting terminal for supplying power to the winding from an external power source. The first and second connecting terminals are both mounted on one of the first bracket and the second bracket.

Preferably, the first connecting terminal and the second connecting terminal are both mounted on one end of the first bracket or the second bracket.

Preferably, each of the first connecting terminal and the second connecting terminal is separately formed and fixed to the winding bracket.

Preferably, the stator further comprises an electronic circuit, the electronic circuit and the winding are connected in series between the first connecting terminal and the second connecting terminal, and the winding is indirectly electrically connected with the electronic circuit.

Preferably, the stator further comprises a connecting member disposed on the winding bracket, and the connecting member is separately formed and electrically connected with the electronic circuit.

Preferably, the electronic circuit comprises a magnetic sensor disposed adjacent the first connecting terminal and the second connecting terminal.

Preferably, said one of the first bracket and the second bracket comprises a winding portion and an inserting portion disposed at one end of the winding portion, and the first connecting terminal and the second connecting terminal are disposed on the inserting portion.

Preferably, the first connecting terminal and the second connecting terminal are arranged in parallel with and offset from each other.

Preferably, the stator core comprises two opposed stator poles and a U-shaped yoke connecting the two stator poles.

In another aspect, a motor is provided which includes a rotor and a stator as described above.

Preferably, the motor further comprises a protective cover, and the protective cover, the first connecting terminal and the second connecting terminal cooperatively form a power socket.

Preferably, the protective cover defines two inserting slots, and a connecting end of the first connecting terminal and a connecting end of the second connecting terminal are received in the two inserting slots, respectively.

Preferably, the two inserting slots are arranged in parallel with and offset from each other.

In still another aspect, a single phase permanent magnet motor is provided which includes a stator and a permanent magnet rotor. The stator includes a pair of power supply terminals, a stator core, a single phase winding wound around the stator core, and a winding bracket disposed between the stator core and the winding. The stator core includes two opposed stator poles and a U-shaped yoke connecting the two stator poles. The winding bracket includes a first bracket and a second bracket attached around two branches of the U-shaped yoke. The power supply terminals are both mounted on the first bracket or the second bracket for supplying power to the single phase winding.

In this motor, the first connecting terminal and the second connecting terminal are both mounted on the same bracket of the winding bracket, thereby facilitating the arrangement of other parts of the motor.

DETAILED DESCRIPTION OF THE PREFERRED EMBODIMENTS

The technical solutions of the embodiments of the present invention will be clearly and completely described as follows with reference to the accompanying drawings. Apparently, the embodiments as described below are merely part of, rather than all, embodiments of the present invention. Based on the embodiments of the present disclosure, any other embodiment obtained by a person skilled in the art without paying any creative effort shall fall within the protection scope of the present invention.

It is noted that, when a component is described to be "connected" to another component, it can be directly connected to said another component or there may be an intermediate component.

Unless otherwise specified, all technical and scientific terms have the ordinary meaning as understood by people skilled in the art. The terms used in this disclosure are illustrative rather than limiting. The term "and/or" as used in this disclosure means that each and every combination of one or more associated items listed are included.

Figure 1:
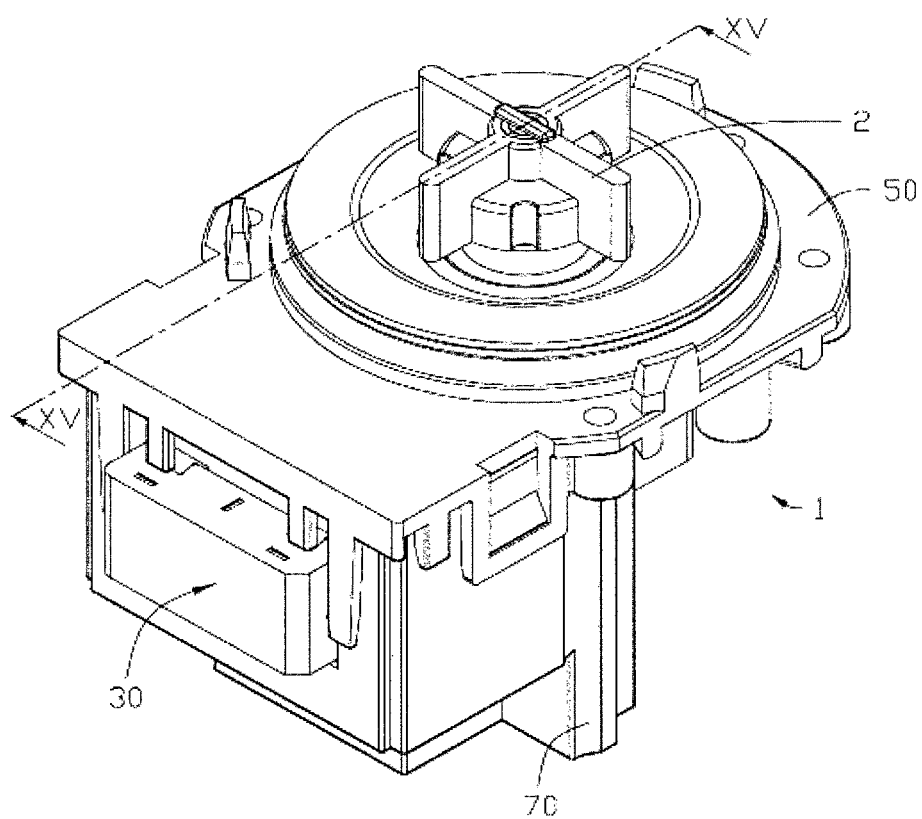
FIG. 1 is a perspective view of a motor according to one embodiment of the present invention.
Figure 2:
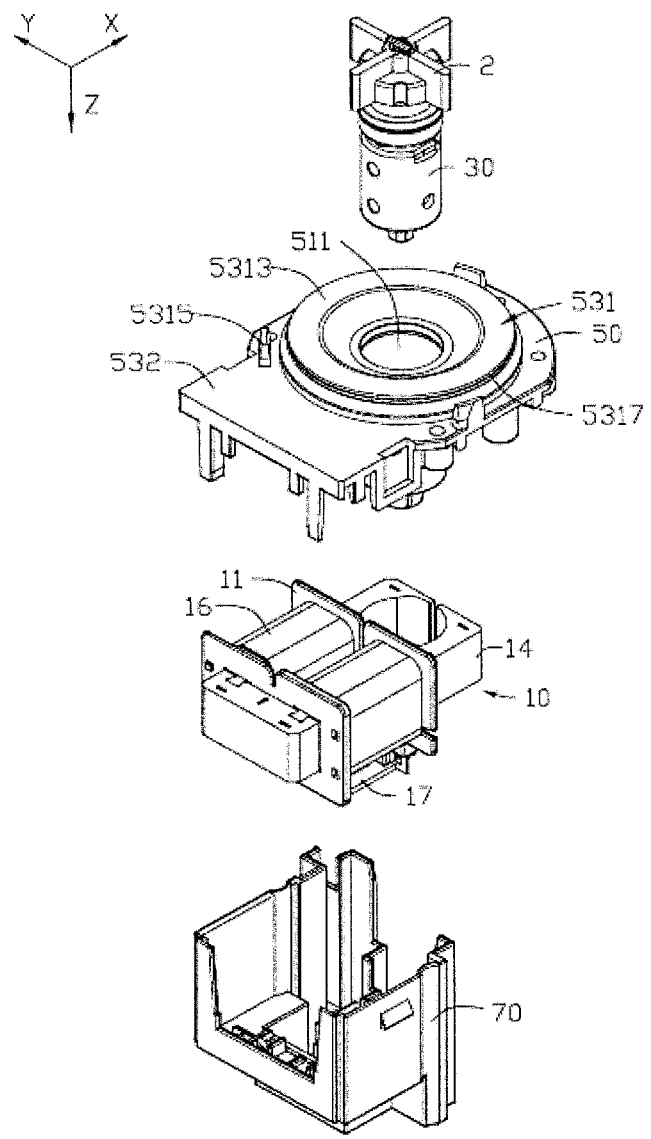
FIG. 2 is a perspective, exploded view of the motor of FIG. 1.
Figure 3:
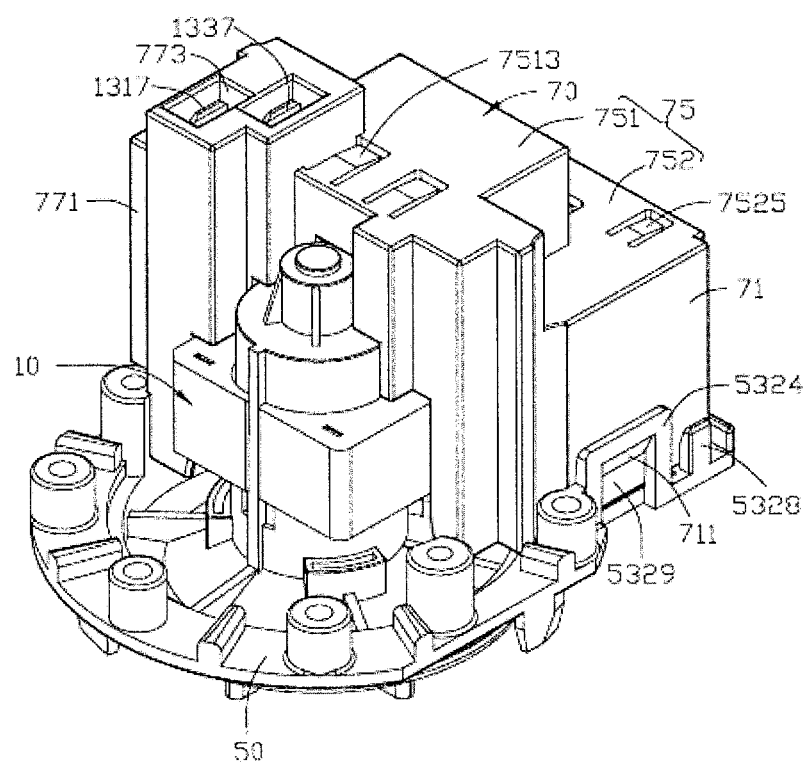
FIG. 3 is a perspective view of the motor of FIG. 1, viewed from another aspect.
Figure 4:
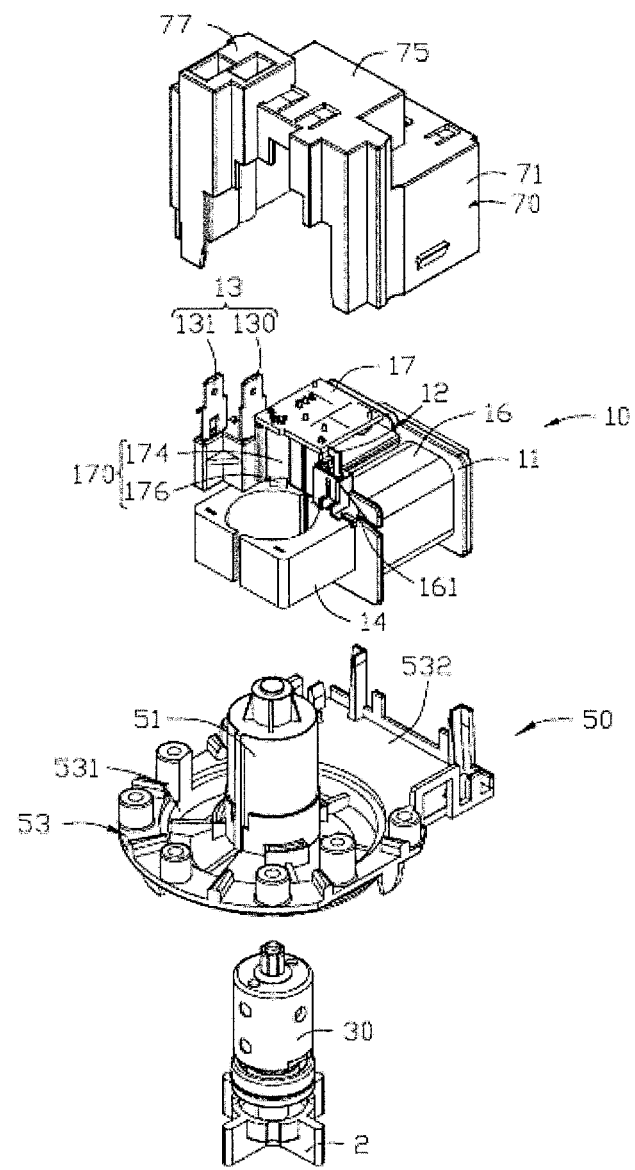
FIG. 4 is a perspective, exploded view of the motor of FIG. 3.
Figure 5:
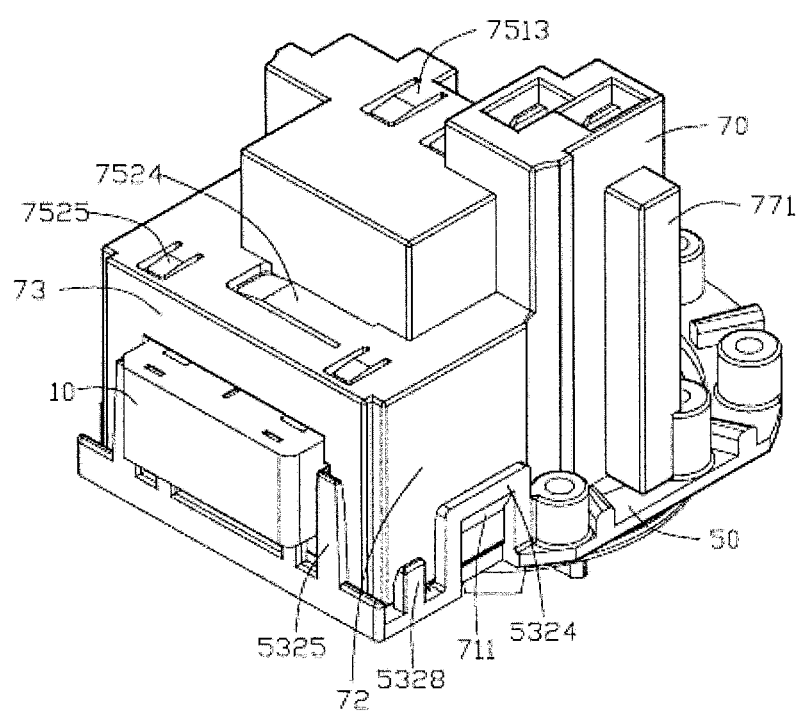
FIG. 5 is a perspective view of the motor of FIG. 1, viewed from still another aspect.
Figure 6:
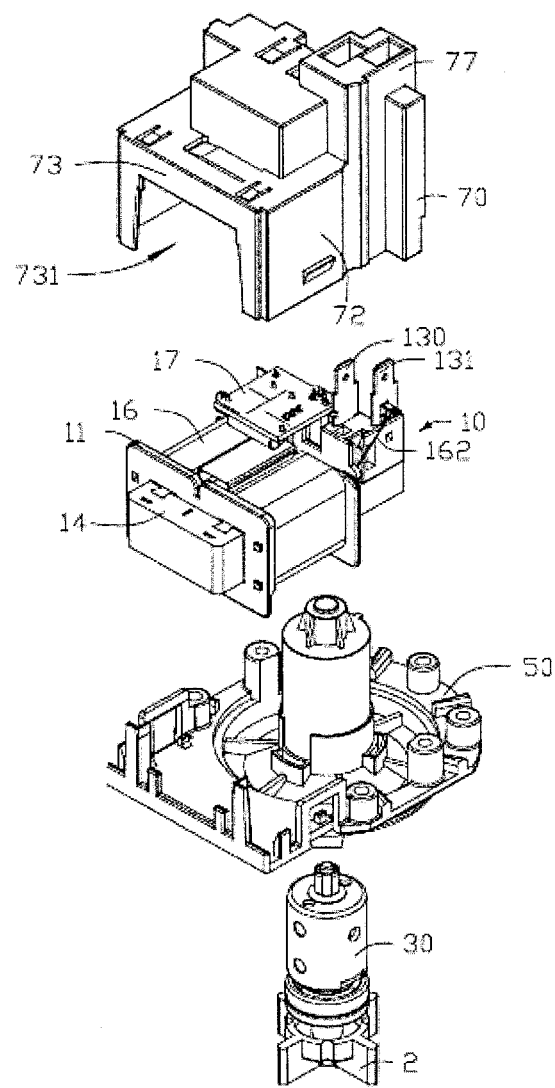
FIG. 6 is a perspective, exploded view of the motor of FIG. 5.
Figure 7:
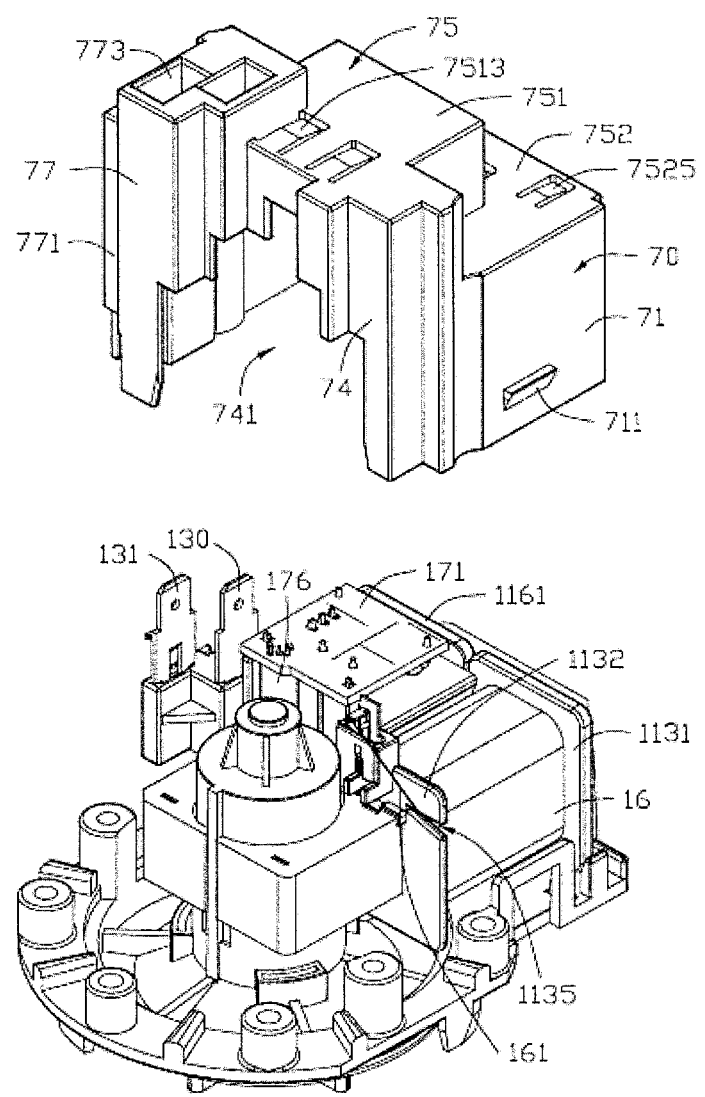
FIG. 7 is a partially exploded view of the motor of FIG. 1.
Figure 8:
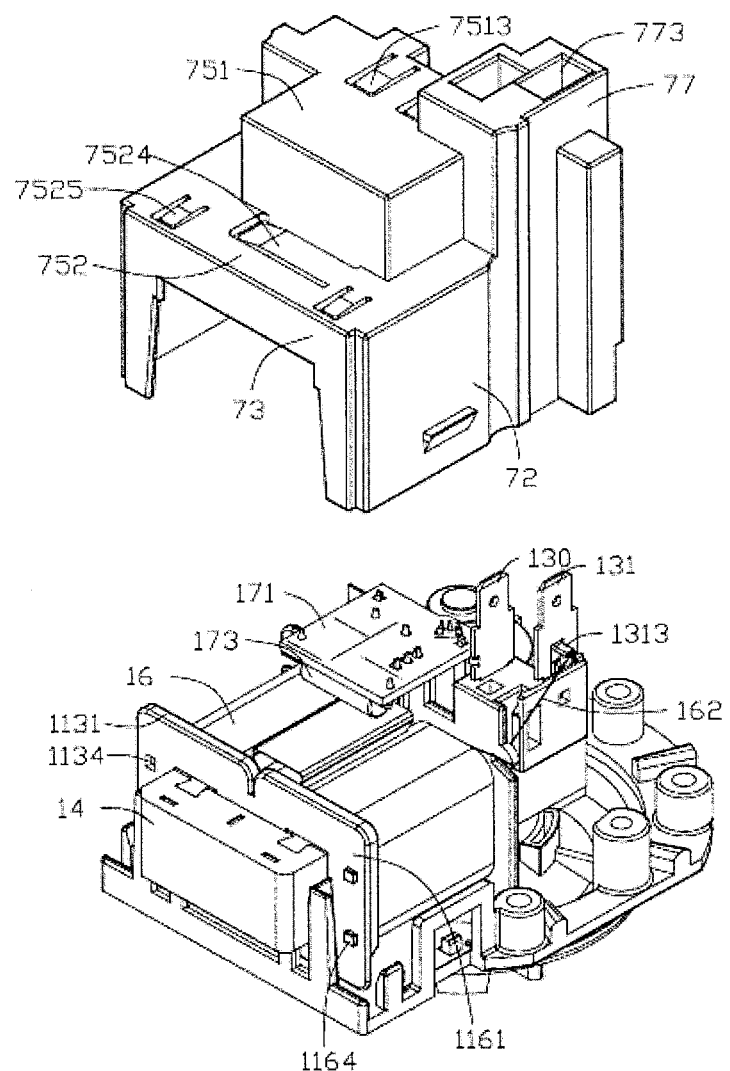
FIG. 8 is a partially exploded view of the motor of FIG. 7, viewed from another aspect.
Figure 9:
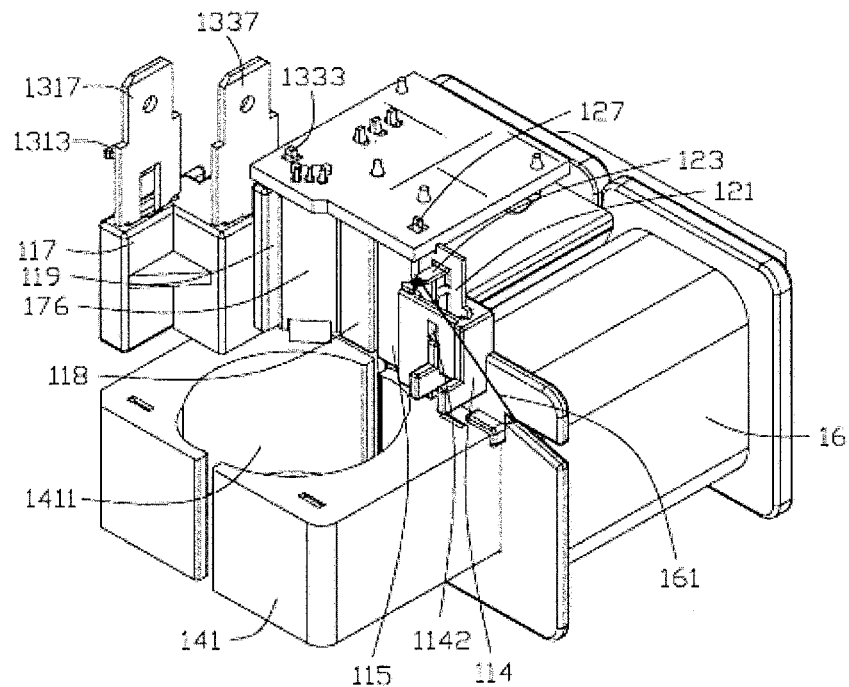
FIG. 9 is a perspective view of the stator of the motor of FIG. 1.
Figure 10:
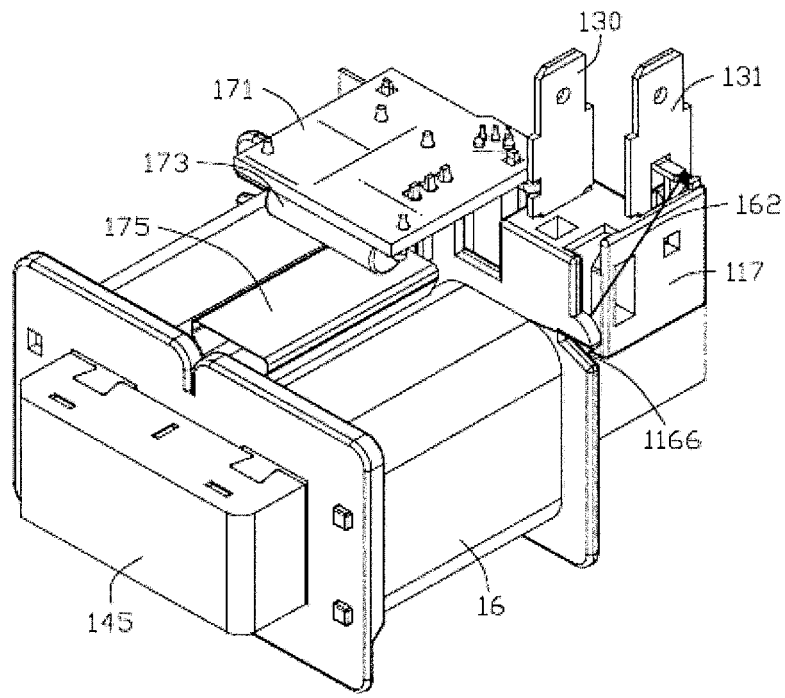
FIG. 10 is a perspective view of the stator of the motor of FIG. 9, viewed from another aspect.
Figure 11:
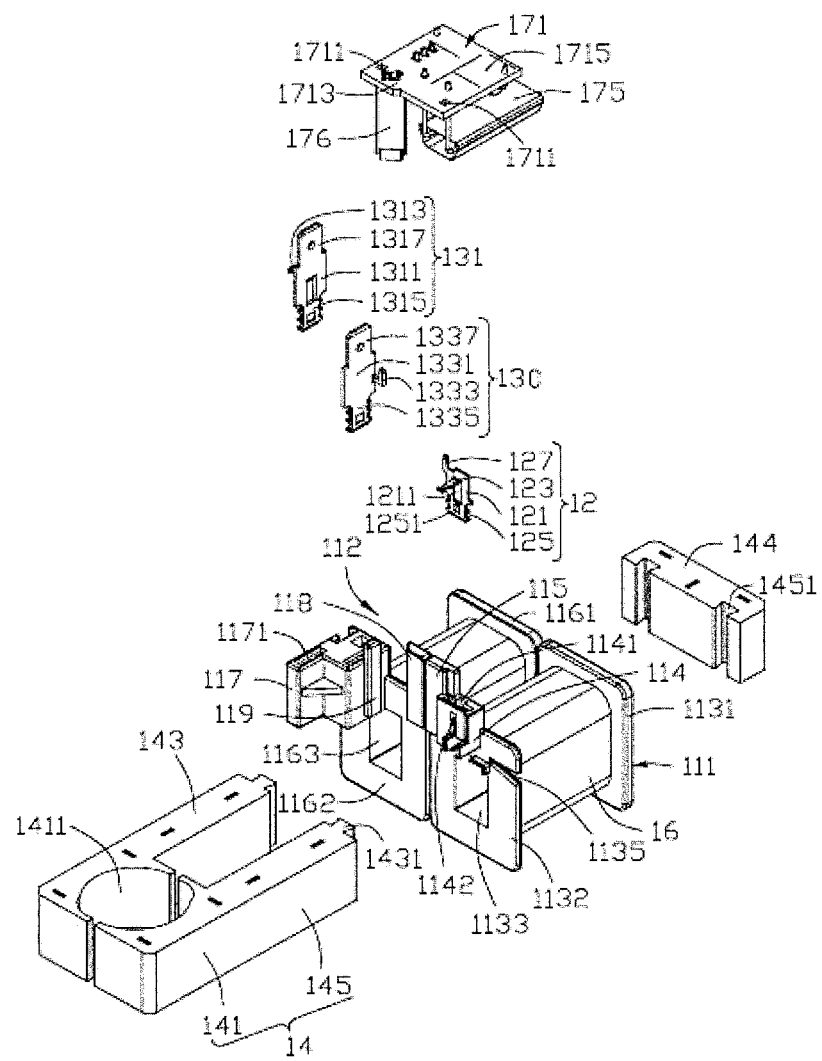
FIG. 11 is a perspective, exploded view of the stator of FIG. 9.
Figure 12:
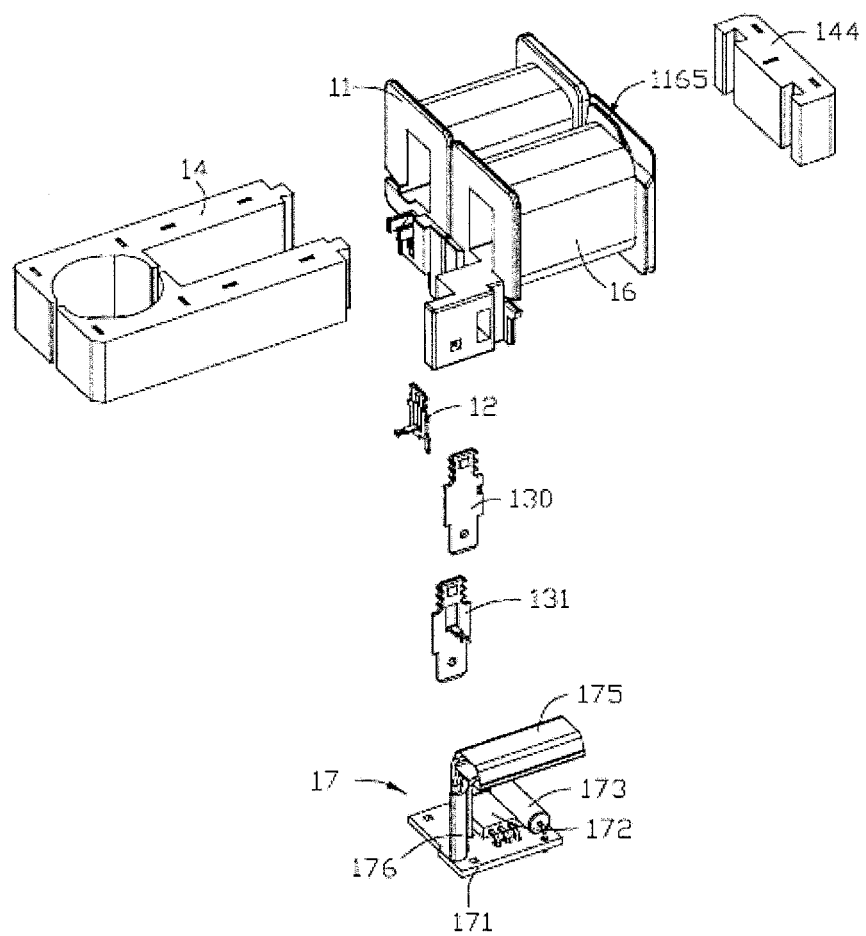
FIG. 12 is a perspective, exploded view of the stator of FIG. 11, viewed from another aspect.

Referring to FIG. 1, a motor 1 in accordance with one embodiment of the present invention is configured to drive an external device to rotate or drive an external device to translate through a transmission device. The external device may be a device that operates under electric power (such as a communication device or an electric device) or a device that operates without electric power supply (such as a vehicle window). In this embodiment, the motor 1 is configured to drive an impeller 2 which may be used in a product such as a washing machine, a dishwasher, or a water pump. The motor 1 of this embodiment may be an inner-rotor single-phase motor. In another embodiment, the motor 1 may be of another type, such as an outer-rotor motor or a single-phase permanent motor.

Referring to FIG. 1 to FIG. 6, the motor 1 includes a stator 10, a rotor 30, a base body 50 covering the rotor 30, and a protective cover 70 snap-fitted with the base body 50. The rotor 30 and the base body 50 covering the rotor 30 together pass through part of the stator 10, and the protective cover 70 covers at least part of the stator 10.

The stator 10 includes a winding bracket 11, a connecting member 12, two connecting terminals 13, a stator core 14, a winding 16, and an electronic circuit. The connecting member 12 and the connecting terminals 13 are disposed on the winding bracket 11, and the winding bracket 11 is mounted on the stator core 14. The winding 16 is wound around the winding bracket 11. Two wire ends of the winding 16 are connected with the connecting member 12 and one (a first connecting terminal 130) of the two connecting terminals 13, respectively, by for example soldering, lapping connection, wrapping connection or indirect connection. The electronic circuit is disposed on the winding bracket 11 and is connected with the connecting member 12 and the other (a second connecting terminal 131) of the two connecting terminals 13, respectively. Preferably, the two connecting terminals are used to connect with a power supply. In this embodiment, the electronic circuit includes a circuit board 17. In this embodiment, the winding 16 is a single phase winding.

The winding bracket 11 is made from an insulation material and, in this embodiment, the winding bracket 11 is a plastic member. In another embodiment, the winding bracket 11 may be made from another insulation material.

The winding bracket 11 includes a first bracket 11 and a second bracket 112 connected rotatably relative to each other. The first bracket 111 includes a first winding portion 113, and a first inserting portion 114 and a first supporting portion 115 disposed on the first winding portion 113. The second bracket 112 includes a second winding portion 116 in parallel with the first winding portion 113, a second inserting portion 117 disposed on the second winding portion 116, a second supporting portion 118 disposed on the second winding portion 116, and a third supporting portion 119 disposed on the second inserting portion 117. The first winding portion 113 and the second winding portion 116 are connected rotatably relative to each other. The first supporting portion 115, the second supporting portion 118 and the third supporting portion 119 have the same height but are not positioned on the same straight line, i.e. the first supporting portion 115, the second supporting portion 118 and the third supporting portion 119 are able to form a supporting plane for supporting the circuit board 17. In this embodiment, the first supporting portion 115 and the second supporting portion 118 are arranged in parallel, and the third supporting portion 119 is perpendicular to the first supporting portion 115 and the second supporting portion 118.

Referring also to FIG. 7 to FIG. 12, the first winding portion 113 is generally in the shape of "I", including a winding column 1130 extending in a first direction (assuming in the X-axis direction), and a first insulation plate 1131 and a second insulation plate 1132 respectively disposed at two ends of the winding column 1130. The first insulation plate 1131 and the second insulation plate 1132 are generally parallel to each other and both perpendicular to the winding column 1130, i.e. the first insulation plate 1131 and the second insulation plate 1132 are both parallel to a YZ plane, where the Y-axis extends in a second direction, the Z-axis extends in a third direction, and the first direction, the second direction and the third direction are perpendicular to one another. The first winding portion 113 defines a first through hole 1133 along the X-axis direction through the first insulation plate 1131, the winding column 1130 and the second insulation plate 1132. In this embodiment, the three directions are introduced for ease of understanding the structural relationship of the elements of the winding portion. It should be understandable that these elements are not limited to be arranged in these directions.

An end face of the first insulation plate 1131 opposite from the second insulation plate 1132 is provided with two first snap-fit portions 1134. In this embodiment, the first snap-fit portions 1134 are locking slots. In other embodiments, the first snap-fit portions 1134 may be other snap-fit structures such as protrusions, hooks or the like. The second insulation plate 1132 defines a wire-clamping groove 1135. In this embodiment, the wire-clamping groove 1135 is generally V-shaped, and passes through two end faces perpendicular to the X-axis and a side face opposite from the second bracket 112. A projection protrudes from an end face of the second insulation plate 1132 opposite from the winding column 1130. The projection is generally in the shape of "⊐" and is disposed at an edge of the first through hole 1133.

The first inserting portion 114 is disposed on the second insulation plate 1132, adjacent the wire-clamping groove 1135 and the projection. In this embodiment, the first inserting portion 114 and the second insulation plate 1132 are integrally formed. In other embodiments, the first inserting portion 114 may be mounted or assembled to the second insulation plate 1132.

The first inserting portion 114 defines a first receiving slot 1141 for receiving the connecting member 12. The first receiving slot 1141 is formed by recessing a face of the first inserting portion 114 that is parallel to an XY plane in a direction perpendicular to the X-axis and parallel to the second insulation plate 1132 (i.e. in the Z-axis direction). In this embodiment, the first receiving slot 1141 is generally in the shape of "凸".

A face (parallel to the YZ plane) of the first inserting portion 114 opposite from the winding column 1130 defines a groove 1142 in communication with the first receiving slot 1141.

In this embodiment, the first supporting portion 115, the first inserting portion 114 and the second insulation plate 1132 are all integrally formed. In other embodiments, the first supporting portion 115 may be integrally formed with or connected to only one of the first inserting portion 114 and the second insulation plate 1132. The first supporting portion 115 is generally bar-shaped, which has a height in the Z-axis direction greater than that of the first inserting portion 114. An edge of the first supporting portion 115 away from the first inserting portion 114 is generally flush with an edge of the second insulation plate 1132. In other embodiments, however, the edges of the first supporting portion 115 and the second insulation plate 1132 may not be flush with each other as long as arrangement of other parts is not affected. In this embodiment, the edge of the first supporting portion 115 is flush with the edge of the second insulation plate 1132. A corner portion of the first supporting portion 115 further forms a guiding groove 1151 extending along the Z-axis direction.

The second winding portion 116 has a shape similar to that of the first winding portion 113. The second winding portion 116 is generally in the shape of "I", including a winding column 1160 extending in the X-axis direction, and a third insulation plate 1161 and a fourth insulation plate 1162 respectively disposed at two ends of the winding column 1160. The third insulation plate 1161 and the fourth insulation plate 1162 are generally parallel to each other and both perpendicular to the winding column 1160, i.e. the third insulation plate 1161 and the fourth insulation plate 1162 are both parallel to a YZ plane, the third insulation plate 1161 and the first insulation plate 1131 are located on the same plane, and the fourth insulation plate 1162 and the second insulation plate 1132 are located on the same plane. The second winding portion 116 defines a second through hole 1163 along the X-axis direction through the third insulation plate 1161, the winding column 1160 and the fourth insulation plate 1162.

Figure 13:
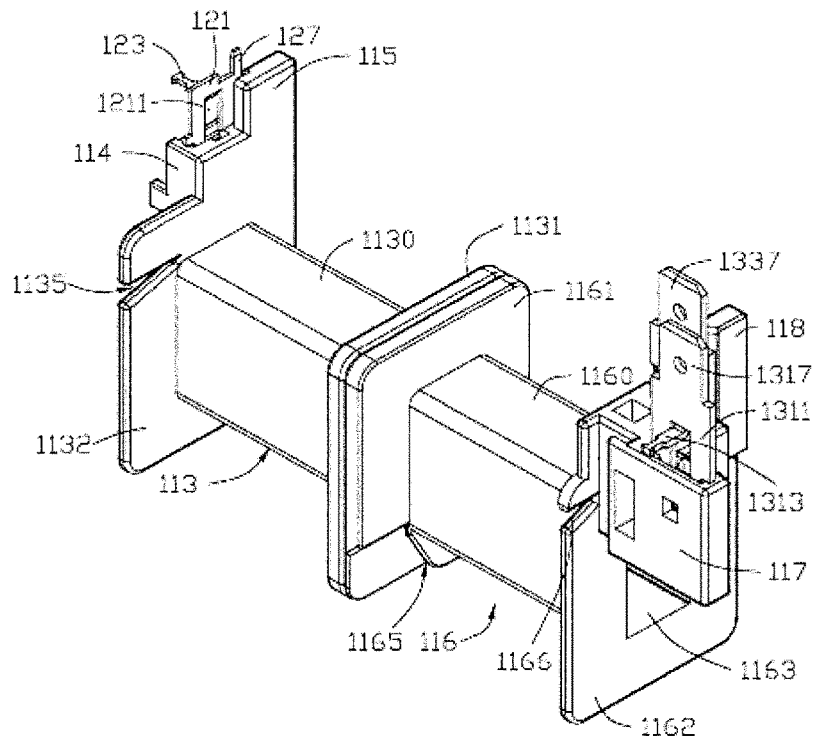
FIG. 13 illustrates a winding bracket of the stator of FIG. 9 during the winding process.

Referring also to FIG. 13, an edge of the third insulation plate 1161 is rotatably connected with an edge of the first insulation plate 1131. In this embodiment, the edge of the third insulation plate 1161 is integrally formed with the edge of the first insulation plate 1131, and a material thickness at a connection area is less than a material thickness of the third insulation plate 1161 or the first insulation plate 1131, such that the third insulation plate 1161 and the first insulation plate 1131 are capable of rotating relatively to a position where the third insulation plate 1161 is parallel to and stacked with the first insulation plate 1131.

An end face of the third insulation plate 1161 opposite from the fourth insulation plate 1162 is provided with two second snap-fit portions 1164. In this embodiment, the second snap-fit portions 1164 are protrusions. In other embodiments, the second snap-fit portions 1164 may be other snap-fit structures for engagement with the first snap-fit portions 1134, such as slots, hooks or the like. When the third insulation plate 1161 and the first insulation plate 1131 rotate relatively to the position where the third insulation plate 1161 and the first insulation plate 1131 are parallel to and stacked with each other, the two second snap-fit portions 1164 engage with two first snap-fit portions 1134 to prevent backward movements of the third insulation plate 1161 and the first insulation plate 1131 under restoring forces, thereby ensuring that the third insulation plate 1161 and the first insulation plate 1131 are arranged on the same straight line and hence facilitating the winding. The third insulation plate 1161 further defines a wire-guiding groove 1165 in a side thereof adjacent the first insulation plate 1131, for facilitating the winding.

The fourth insulation plate 1162 defines a wire-clamping groove 1166. In this embodiment, the wire-connecting groove 1166 is generally V-shaped, and passes through two end faces perpendicular to the X-axis and a side face opposite from the first bracket 111.

The second inserting portion 117 is disposed on the fourth insulation plate 1162 adjacent the wire-clamping groove 1166. In this embodiment, the second inserting portion 117 and the fourth insulation plate 1162 are integrally formed. In other embodiments, the second inserting portion 117 may be mounted or assembled to the fourth insulation plate 1162.

The second inserting portion 117 defines two second receiving slots 1171 for receiving two connecting terminals 13. The second receiving slot 1171 has a shape similar to that of the first receiving slot 1141. The two second receiving slots 1171 are generally parallel to each other but are arranged offset from each other.

In this embodiment, the second supporting portion 118 and the fourth insulation plate 1162 are integrally formed. The second supporting portion 118 is generally bar-shaped, which is arranged in parallel with the first supporting portion 115. The second supporting portion 118 has a height in the Z-axis direction equal to that of the first supporting portion 115. An edge of the second supporting portion 118 away from the second inserting portion 117 is generally flush with an edge of the fourth insulation plate 1162. In other embodiments, however, the edges of the second supporting portion 118 and the fourth insulation plate 1162 may not be flush with each other as long as arrangement of other parts is not affected. In this embodiment, the edge of the second supporting portion 118 is flush with the edge of the fourth insulation plate 1162.

In this embodiment, the third supporting portion 119 is integrally formed with the second inserting portion 117, extends along the Z-axis direction, and is located on a face (parallel to the XZ plane) of the second inserting portion 117 adjacent the second supporting portion 118. In this embodiment, the third supporting portion 119 has a height in the Z-axis direction equal to that of the second supporting portion 118. In other embodiments, the third supporting portion 119 may also be disposed on the fourth insulation plate 1162.

In another embodiment, the first supporting portion 115, the second supporting portion 118 and the third supporting portion 119 may be omitted, or only one or two of the first supporting portion 115, the second supporting portion 118 and the third supporting portion 119 are formed. In the embodiment that the first supporting portion 115, the second supporting portion 118 and the third supporting portion 119 are omitted, the circuit board 17 is supported only by the connecting member 12 and the first connecting terminal 130.

In another embodiment, the winding may have a structure different from those described herein, and the circuit board 17 may be supported on the winding bracket by other means.

In another embodiment, the first insulation plate 1131 and the third insulation plate 1161 may be disconnected from each other, and the first bracket 111 and the second bracket 112 may be two separate parts. During the winding process, the first bracket 111 and the second bracket 112 are connected end-to-end.

It should be understood that it is not intended to limit the structure of the winding bracket 11 of other embodiments to those described above. In addition, for facilitating the understanding of the structure and orientations of the winding bracket 11, the integrally formed winding bracket 11 is divided into parts, such as the inserting portions, supporting portions, in the above description. In other embodiments, the winding bracket 11 may not have these structures.

The connecting member 12 is made from a conductive material, which is inserted into the first receiving slot 1141 and used to electrically connect the circuit board 17 with the winding 16. The connecting member 12 is separately formed and then soldered to the circuit board 17. In this embodiment, the connecting member 12 is generally sheet-shaped. The connecting member 12 includes a body 121, a wire-connecting portion 123 bent from the body 121, a fixing portion 125 connected with one end of the body 121, a connecting portion 127 connected with another end of the body 121. The body 121, the wire-connecting portion 123, the fixing portion 125, and the connecting portion 127 are integrally formed. The body 121 defines an opening 1211, and the wire-connecting portion 123 is disposed adjacent an edge of the opening 1211. In this embodiment, the wire-connecting portion 123 is formed by bending a portion cut from the body 121. In another embodiment, the wire-connecting portion 123 may be formed by stamping the body 121 or, alternatively, the wire-connecting portion 123 may be formed as a separate part that is assembled to the body 121.

The fixing portion 125 is configured for insertion into the first receiving slot 1141 to fix the connecting member 12 to the first inserting portion 114. Teeth are formed on both of two sides of the fixing portion 125 to enhance the fixing effect. A protrusion 1251 further protrudes from the fixing portion 125 to further enhance the connecting strength of the fixing portion 125 in the first receiving slot 1141. The protrusion 1251 is formed with a beveled surface for facilitating inserting the connecting member 12 into and removing the connecting member 12 from the first receiving slot 1141, and the protrusion 1251 is snap-fitted in the groove 1142. The connecting portion 127 and the body 121 are located on the same plane and are generally perpendicular to the wire-connecting portion 123. In this embodiment, the connecting portion 127 is formed by cutting the body 121. In another embodiment, the connecting portion 127 may also be a separate part assembled to the body 121. In this embodiment, the connecting member 12 is disposed on the first inserting portion 114 along the YZ plane, and the wire-connecting portion 123 is disposed along the X-axis direction. In other embodiments, the connecting member 12 may have any suitable orientation.

The two connecting terminals 13 (i.e. the first connecting terminal 130 and the second connecting terminal 131) are inserted in the two second inserting portion 117, respectively. The two connecting terminals 13 act as power supply terminals. In this embodiment, each of the two connecting terminals 13 is separately formed.

The second connecting terminal 131 includes a body 1311, a wire-connecting portion 1313 bent from the body 1311, a fixing portion 1315 connected with one end of the body 1311, and a connecting end 1317 connected with another end of the body 1311. The connecting end 1317 is configured for connecting with a power supply. The body 1311 defines an opening, and the wire-connecting portion 1313 is disposed adjacent an edge of the opening. In this embodiment, the wire-connecting portion 1313 is formed by bending a portion cut from the body 1311. In another embodiment, the wire-connecting portion 1313 may be formed by stamping the body 1311 or, alternatively, the wire-connecting portion 1313 may be formed as a separate part that is assembled to the body 1311.

The fixing portion 1315 is configured for insertion into one of the second receiving slots 1171 to fix the second connecting terminal 131 to the second inserting portion 117. Teeth are formed on both of two sides of the fixing portion 1315 to enhance the fixing effect. A protrusion further protrudes from the fixing portion 1315 to further enhance the connecting strength of the fixing portion 1315 in the second receiving slot 1171. The protrusion is formed with a beveled surface for facilitating inserting the second connecting terminal 131 into and removing the second connecting terminal 131 from the second receiving slot 1171. The connecting end 1317 and the body 1311 are located on the same plane and are generally perpendicular to the wire-connecting portion 1313. In this embodiment, the connecting portion 1317, the body 1311, and the wire-connecting portion 1313 are integrally formed. In another embodiment, the connecting end 1317 may also be a separate part assembled to the body 1311. In this embodiment, the second connecting terminal 131 is disposed on the second inserting portion 117 along the XZ plane, and the wire-connecting portion 1313 is disposed along the Y-axis direction. In other embodiments, the second connecting terminal 131 may have any suitable orientation.

The first connecting terminal 130 includes a body 1331, a connecting portion 1333 bent from the body 1331, a fixing portion 1335 connected with one end of the body 1331, and a connecting end 1337 connected with another end of the body 1331. The connecting portion 1333 fixes and is electrically connected to the circuit board 17, and the connecting end 1337 is configured for connecting with a power supply. In this embodiment, the connecting portion 1333 is generally in the shape of "⌐" which is bent from an edge of the body 1331. The fixing portion 1335 is configured for insertion into the other of the second receiving slots 1171 to position the first connecting terminal 130 to the second inserting portion 117. Teeth are formed on both of two sides of the fixing portion 1335 to enhance the fixing effect. A protrusion further protrudes from the fixing portion 1335 to further enhance the connecting strength of the fixing portion 1335 in the second receiving slot 1171. The protrusion is formed with a beveled surface for facilitating inserting the first connecting terminal 130 into and removing the first connecting terminal 130 from the second receiving slot 1171. The connecting end 1337 and the body 1331 are disposed on the same plane, and the connecting end 1337 is arranged in parallel with and spaced from the connecting end 1317 of the second connecting terminal 131.

In another embodiment, the two connecting terminals 13 may be disposed at the other end of the winding bracket 11.

The stator core 14 includes a pair of opposing stator poles 141 and a U-shaped yoke 145 connecting the pair of stator poles 141. The yoke 145 includes a pair of yoke branches 143 respectively connected with the pair of stator poles 141, and a connecting portion 144 connecting the pair of yoke branches 143. The first bracket 111 and the second bracket 112 are attached around the two yoke branches 143, respectively. Each stator yoke 141 includes an arc pole face that concaves inwardly, and the two stator poles 141 cooperatively define a passage 1411 having a generally circular cross-section, for allowing the rotor 30 to pass therethrough. The yoke branches 143 are each generally elongated and arranged generally in parallel with each other. In this embodiment, the two yoke branches 143 extend in the X-axis direction. Each yoke branch 143 and one associated stator pole 141 are integrally formed by stacking a plurality of laminations. A protrusion 1431 protrudes from an end portion of each yoke branch 143 opposite from the stator pole 141. The connecting portion 144 is formed by stacking a plurality of laminations. The connecting portion 144 defines two spaced latching grooves 1451. The protrusions 1431 of the two yoke branches 143 are detachably latched in the latching grooves 1451, respectively. In this embodiment, the latching grooves 1451 are dovetail grooves. In this embodiment, the three supporting portions are all disposed at one end of the winding bracket 11 adjacent the stator poles 141, and the circuit board 17 is supported by the three supporting portions.

The electronic circuit and the winding 16 are connected in series between the first connecting terminal 130 and the second connecting terminal 131, and the winding 16 and the electronic circuit are indirectly electrically connected. The winding 16 is wound around the winding column 1130 and the winding column 1160. In this embodiment, the winding 16 is wound using a single wire with a first wire end 161 and a second wire end 162. The first wire end 161 is wound around and soldered to the wire-connecting portion 123 of the connecting member 12, and the second wire end 162 is wound around and soldered to the wire-connecting portion 1313 of the second connecting terminal 131. In making the winding 16, the first wire end 161 is first wound around the wire-connecting portion 123, and the wire is then wound around the winding column 1130. After the winding around the winding column 1130 is completed, the wire is pulled through the wire-guiding groove 1165 of the third insulation plate 1161. The wire passing through the wire-guiding groove 1165 is continuously wound around the winding column 1160, and then the second wire end 162 is wound around the wire-connecting portion 1313, with the excessive wire being cut off. Finally, the first wire end 161 is soldered to the wire-connecting portion 123, and the second wire-connecting end 162 is soldered to the wire-connecting portion 1313.

Figure 14:
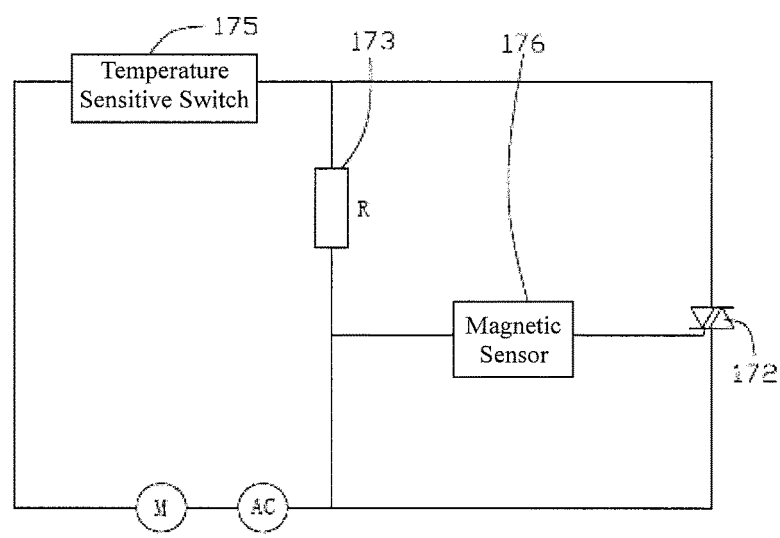
FIG. 14 is a circuit diagram of the motor of FIG. 1.

In this embodiment, only one side of the circuit board 17 adjacent the stator poles 141 is supported by one end of the winding bracket 11 adjacent the stator poles 141, and the circuit board 17 does not overlap with one end of the winding bracket 11 away from the stator poles 141. Referring also to FIG. 14, the circuit board 17 is supported on the connecting member 12, the first connecting terminal 130, the first bracket 111 and the second bracket 112. The circuit board 17 includes a circuit substrate 171, and an alternating current (AC) switch 172, a voltage dropping resistor 173, a temperature sensitive switch 175 and a magnetic sensor 176 that are connected to the circuit substrate 171.

Preferably, the AC switch 172, the voltage dropping resistor 173, the temperature sensitive switch 175 and the magnetic sensor 176 are all located on a side of the circuit substrate 171 adjacent the stator core 14. The temperature sensitive switch 175 protrudes beyond the circuit board 17 and extends between the two ends of the winding bracket 11 toward and away from the stator poles 141. The magnetic sensor 176 and the winding 16 are located on two sides of the first supporting portion 115 and/or the second supporting portion 118. The magnetic sensor 176 are disposed adjacent the two connecting terminals 13, between the two connecting terminals 13 and the connecting member 12, and at an end of the yoke 145 adjacent the stator poles 141.

Preferably, implementation of the circuit of the present embodiment may refer to the circuit described in PCT application number PCT/CN2015/086422 filed by this Applicant, the entire content of which application is incorporated by reference herein.

According to another embodiment, the circuit may be all integrated into an electronic component. The electronic component may be disposed on a circuit substrate or, alternatively, independently fixed to the stator and directly or indirectly electrically connected with the second connecting terminal and the winding, without the need of providing the circuit board.

Understandably, the circuit board 17 may optionally carry circuits other than the circuit described above.

In this embodiment, the magnetic sensor 176 is a Hall IC.

In this embodiment, the circuit substrate 171 has a generally square shape. The circuit substrate 171 defines two spaced inserting openings 1711 for insertion of the connecting portion 127 of the connecting member 12 and the connecting portion 1333 of the first connecting terminal 130. The inserting openings 1711 are generally square holes located adjacent two neighboring corners of the circuit substrate 171. For facilitating describing the locations of various electronic components on the circuit substrate 171, the circuit substrate 171 is divided into a first portion 1713 and a second portion 1715 by a line connecting the two inserting openings 1711. Because the two inserting openings 1711 are located adjacent two neighboring corners of the circuit substrate 171, respectively, the first portion 1713 and the second portion 1715 have different areas. The portion with a smaller area is defined as the first portion 1713, and the portion with a larger area is defined as the second portion 1715.

The connecting portion 127 of the connecting member 12 and the connecting portion 1333 of the first connecting terminal 130 are inserted into the two inserting openings 1711, respectively, such that the circuit substrate 171 is supported on the first supporting portion 115, the second supporting portion 118, and the third supporting portion 119. The connecting portion 127 of the connecting member 12 and the connecting portion 1333 of the first connecting terminal 130 are soldered to the circuit substrate 171.

The magnetic sensor 176 is disposed on the first portion 1713 of the circuit substrate 171, adjacent one inserting opening 1711. The magnetic sensor 176 is generally perpendicular to the circuit substrate 171, and extends from the circuit substrate 171 to a position close to the stator poles 141 and is disposed at one side of the passage 1411, for facilitating detecting rotation of the rotor. The AC switch 172, voltage dropping resistor 173 and temperature sensitive switch 175 are all disposed on the second portion 1715 of the circuit substrate 171. The temperature sensitive switch 175 extends out from the circuit substrate 171 and is disposed close to the winding 16 for accurate temperature detection.

In this embodiment, instead of being directly soldered to the circuit board 17, the wire end 16 is connected to the circuit board 17 through the connecting member 12, which greatly simplifies the structure of the circuit board 17. In addition, the circuit substrate 171 of this embodiment has a small area, has a length in a first direction less than the length of the winding column, and is supported only at a single end of the winding bracket 11, without the need of being supported at both ends of the winding bracket 11, which results in reduced cost and easier assembly.

Figure 15:
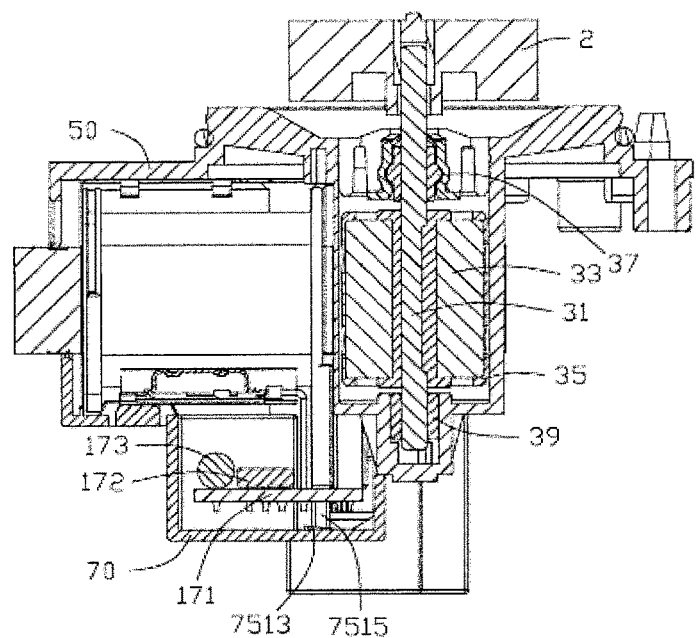
FIG. 15 is a sectional view of the motor of FIG. 1, taken along line XV-XV thereof.

Referring also to FIG. 15, the rotor 30 includes a rotary shaft 31, a magnet 33 fixed to the rotary shaft 31, a first bearing 37, and a second bearing 39. An impeller 2 is mounted to the rotary shaft 31. The first bearing 37 and the second bearing 39 are attached around the rotary shaft 31 at two ends of the magnet 33. In this embodiment, the magnet 33 is fixed to the rotary shaft 31 through a retaining bracket 35 which is formed by injection molding.

Figure 16:
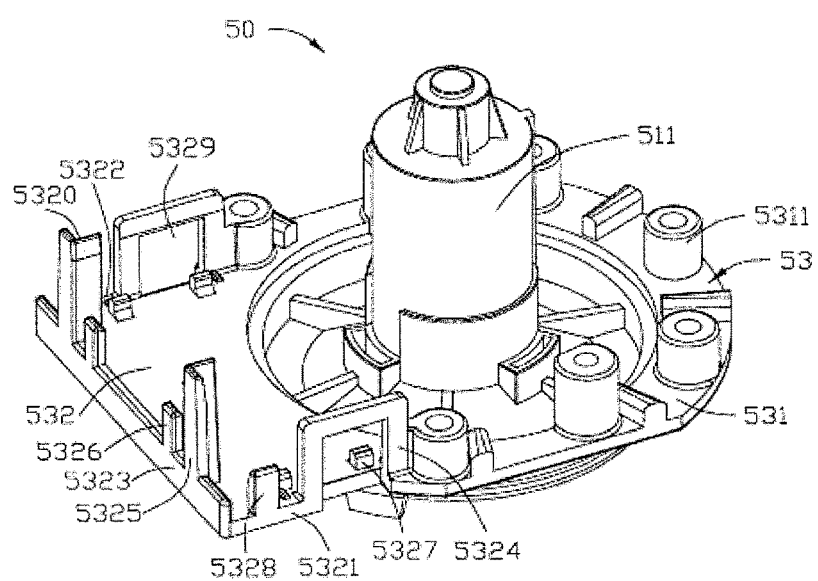
FIG. 16 is a perspective view of a base body of the motor of FIG. 1.

Referring also to FIG. 16, the base body 50 includes a cover 51 and a mounting portion 53 connected with the cover 51. The cover 51 is a generally hollow cylinder in shape and defines a receiving space 511. The cover 51 covers on the rotor 30, and the rotary shaft 31 is supported by the first bearing 37 and the second bearing 39 for rotation relative to the cover 51. The mounting portion 53 facilitates integratedly assembling the motor 1 in a using environment and allows the protective cover 70 to be mounted on the base body 50. The mounting portion 53 includes a first assembling portion 531 connected with the cover 51 and a second assembling portion 532 connected with the first assembling portion 531. In this embodiment, the first assembling portion 531 has a generally circular shape, and the second assembling portion 532 has a generally rectangular shape.

A plurality of positioning posts 5311 protrudes from a face of the first assembling portion 531 adjacent the cover 51, and a boss 5313 and a plurality of position-limiting portions 5315 protrude from a face of the first assembling portion 531 opposite from the cover 51. The positioning posts 5311 are disposed surrounding the cover 51. Each positioning post 5311 is generally a circular cylinder in shape, which defines a through hole along its central axis. The boss 5313 is generally circular and has a center recessed inwardly to be in communication with the receiving space 511. A sealing ring 5317 is attached around an outer side surface of the boss 5313. The position-limiting portions 5315 are disposed around an outer periphery of the boss 5313 and spaced from the outer side surface of the boss 5313.

The second assembling portion 532 includes a first side 5321 and a second side 5322 opposite from each other, and a third side 5323 connected with the first side 5321 and the second side 5322. In this embodiment, the first side 5321 and the second side 5322 extend in the X-axis direction and the third side 5323 extends in the Y-axis direction.

A face of the second assembling portion 532 adjacent the cover 51 is formed with a pair of snap-fit portions 5324, a pair of guiding portions 5325, a pair of supporting posts 5326, two pairs of inner stop portions 5327, and a pair of outer stop portions 5328, which all extend in the Z-axis direction.

The snap-fit portions 5324 are respectively located at the first side 5321 and the second side 5322, and are arranged in parallel and spaced from each other, for latching the protective cover 70. Each snap-fit portion 5324 defines a latching opening 5329. In this embodiment, the latching opening 5329 is generally rectangular.

The guiding portions 5325 are disposed at the third side 5323 and spaced from each other. Each guiding portion 5325 has a generally L-shaped cross-section. Each guiding portion 5325 defines a guiding groove 5320 for guiding the protective cover 70.

The supporting posts 5326 are disposed at the third side 5323 between the pair of guiding portions 5325. A height of the supporting posts 5326 is less than a height of the guiding portions 5325. The supporting posts 5326 are configured for supporting the yoke 145 and resisting the first insulation plate 1131 and the third insulation plate 1161. One of the two pairs of inner stop portions 5327 is disposed adjacent the first side 5321, and the other pair is disposed adjacent the second side 5322. The outer stop portions 5328 are respectively disposed at the first side 5321 and the second side 5322. Each outer stop portion 5328 is spaced a distance from an associated pair of inner stop portions 5327, for allowing the protective cover 70 to be inserted and positioned.

The protective cover 70, and the first connecting terminal 130 and the second connecting terminal 131 together form a power socket. The protective cover 70 covers on the winding bracket 11, the connecting member 12, part of the stator core 14, the winding 16 and the circuit board 17, and is connected with the second assembling portion 532 of the base body 50. The two connecting terminals 13 are exposed to an outside of the protective cover 70, for connecting with a power supply. Preferably, the protective cover 70 and the two connecting terminals 13 together form a power socket, into which an external plug is directly inserted.

Figure 17:
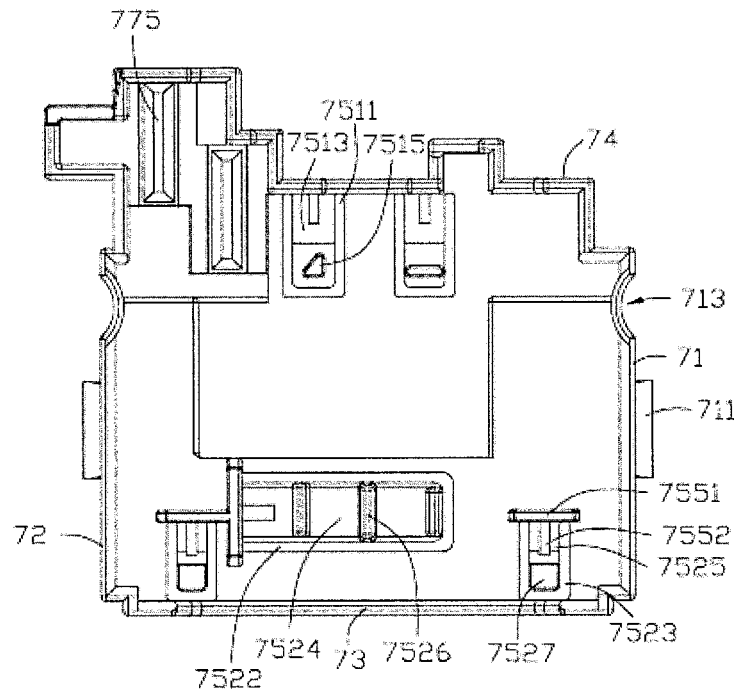
FIG. 17 is a top view of a protective cover of the motor of FIG. 1.

Referring also to FIG. 17, the protective cover 70 includes a first sidewall 71, a second sidewall 72 opposed to the first sidewall 71, a third sidewall 73 connected with the first sidewall 71 and the second sidewall 72, a fourth sidewall 74 connected with the third sidewall 73, and an end wall 75 connected with the four sidewalls. The first sidewall 71 and the second sidewall 72 are disposed along the XZ plane, and the third sidewall 73 and the fourth sidewall 74 are disposed along the YZ plane.

Locking portions 711 protrude from the first sidewall 71 and the second sidewall 72, respectively, which are configured to be detachably engaged in the latching openings 5329. The first sidewall 71 and the second sidewall 72 each further defines an arc avoidance groove 713 adjacent the fourth sidewall 74, for avoiding the two positioning posts 5311.

The third sidewall 73 defines an opening 731 for allowing the yoke 145 to pass therethrough. Two sides of the opening 731 are configured to be inserted into and received in the guiding groove 5320 of the guiding portion 5325. The fourth sidewall 74 defines another opening 741, for allowing the stator poles 141 to pass therethrough, and an edge of the opening 741 is configured to abut against the stator poles 141 and the cover 51. A positioning portion 771 protrudes from the fourth sidewall 74, for increasing a pressing force exerted on the stator poles 141 and the cover 51 and increasing a pressing area, thus resulting in more secure positioning. A terminal receiving portion 77 protrudes from a connection area between the second sidewall 72 and the fourth sidewall 74. A plurality of positioning portions 771 likewise protrudes from outer sidewalls of the terminal receiving portion 77, thereby increasing the pressing area and pressing force on the stator poles 141, the cover 51 and the mounting portion 53 and hence resulting in more secure positioning. A top face of the terminal receiving portion 77 is further formed with two inserting slots 773, and a through slot 775 is defined below each inserting slot 773. The inserting slot 773 is greater than the through slot 775 in width. After respectively passing through the through slots 775, the connecting end 1317 and connecting end 1337 of the two connecting terminals 13 are received in the two inserting slots 773.

The end wall 75 is a stepped wall, including a first end face 751, a second end face 752, and a plurality of side faces connected with the first end face 751 and the second end face 752. The first end face 751 and the second end face 752 are disposed along the XY plane. The first end face 751 has a greater height than the second end face 752. The terminal receiving portion 77 has a greater height than the first end face 751.

The first end face 751 defines two first receiving slots 7511. A first pressing tab 7513 protrudes from an edge of each first receiving slot 7511, and each first pressing tab 7513 is received in the corresponding first receiving slot 7511. Each first pressing tab 7513 has a distal end inclined slightly toward the protective cover 70. A pressing protrusion 7515 protrudes from an inner surface of each first pressing tab 7513, and the pressing protrusion 7515 is disposed on the distal end of the first pressing tab 7513.

The second end face 752 defines a second receiving slot 7522 and two third receiving slots 7523. The two third receiving slots 7523 are closer to the third sidewall 73 than the second receiving slot 7522, and the second receiving slot 7522 is located between the two third receiving slots 7523. The second receiving slot 7522 is located corresponding to the position of the temperature sensitive switch 175, and the two third receiving slots 7523 are located corresponding to the positions of the first insulation plate 1131 and the third insulation plate 1161, respectively.

A second pressing tab 7524 protrudes from an edge of the second receiving slot 7522. A third pressing tab 7525 protrudes from an edge of each third receiving slot 7523. In this embodiment, the second pressing tab 7524 is generally perpendicular to the two third pressing tabs 7525. The second pressing tab 7524 is disposed in parallel with the Y-axis, and the third pressing tab 7525 is disposed in parallel with the X-axis. A length of the second pressing tab 7524 is greater than a length of each third pressing tab 7525. The second pressing tab 7524 and the third pressing tabs 7525 each have a distal end inclined slightly toward the protective cover 70. At least one pressing protrusion 7526 protrudes from an inner surface of the second pressing tab 7524. In this embodiment, there are three pressing protrusions 7526 which are spaced from each other. A pressing protrusion 7527 protrudes from an inner surface of each third pressing tab 7525, and the pressing protrusion 7527 is disposed on the distal end of the third pressing tab 7525. The pressing protrusions of the second pressing tab 7524 abut against the temperature sensitive switch 175. The pressing protrusions 7527 of the two third pressing tabs 7525 abut against the first insulation plate 1131 and the third insulation plate 1161, respectively.

A connection reinforcement structure 755 is formed at a connection area between each of the first pressing tab 7513, the second pressing tab 7524 and the third pressing tab 7525 and the edge of one corresponding receiving slot, thus reinforcing the connection of each pressing tab to the end wall 75. Each connection reinforcement structure 755 includes a reinforcement protrusion 7551 disposed at the edge of one corresponding receiving slot, and a reinforcement portion 7552 connecting the reinforcement protrusion 7551 to the corresponding pressing tab. In this embodiment, the reinforcement protrusion 7551 is generally plate-shaped, the reinforcement portion 7552 is generally triangle-shaped, and the reinforcement protrusion 7551 is generally perpendicular to the reinforcement portion 7552. It should be understood that, in another embodiment, one, two or all of the first pressing tab 7513, the second pressing tab 7524, and the third pressing tab 7525 can be omitted.

Assembly of the motor 1 may include, but is not limited to, the following steps.

Assembly of the rotor 30: the rotary shaft 31 passes through the magnet 33, and the first bearing 37 and the second bearing 39 are attached around two ends of the rotary shaft 31.

Assembly of the rotor 30 with the base body 50: the cover 51 of the base body 50 is placed to cover on the rotor 30 and is attached around the first bearing 37 and the second bearing 39.

Figure 18:
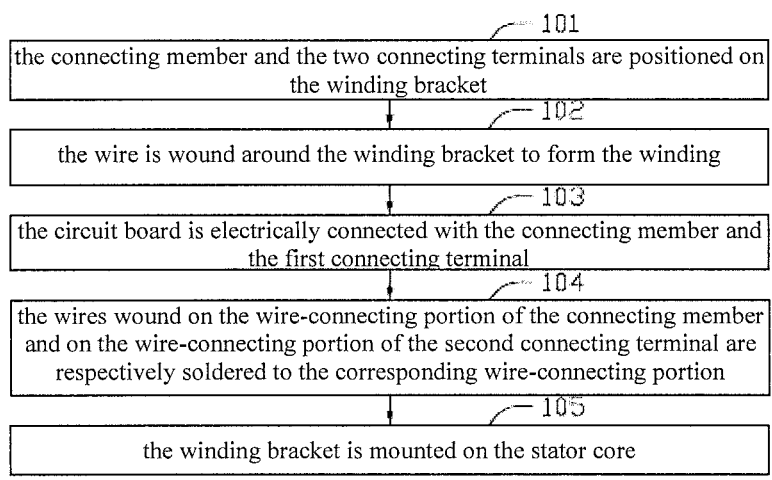
FIG. 18 is a flow chart of an assembly method of the motor of FIG. 1.

Referring to FIG. 18, assembly of the stator 10 includes the following steps.

Step 101: the connecting member 12 and the two connecting terminals 13 are positioned on the winding bracket 11, for example, by inserting the connecting member 12 and the two connecting terminals 13 into the first receiving slot 1141 and the two second receiving slots 1171, respectively.

Figure 19:
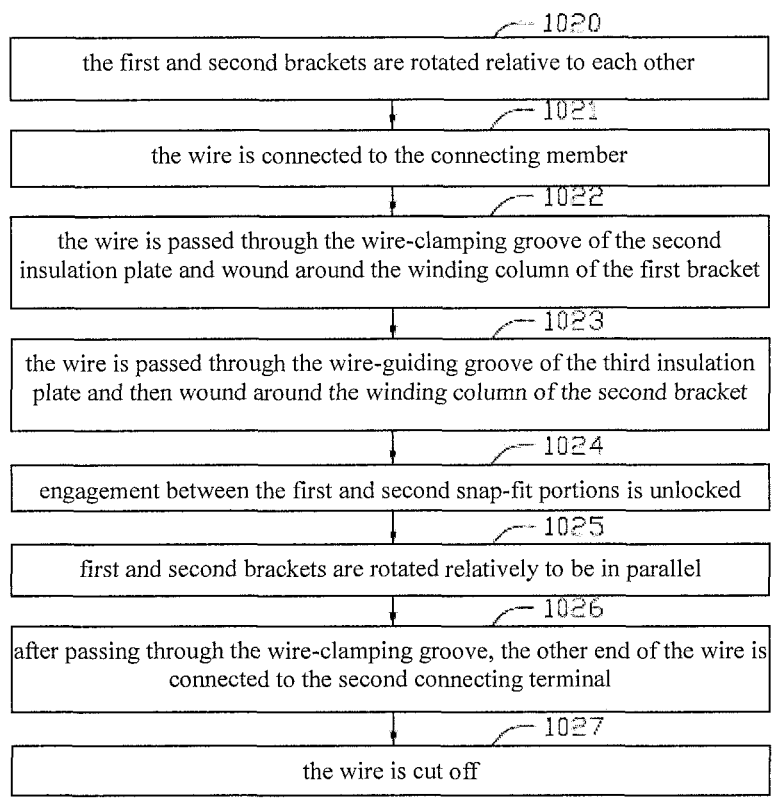
FIG. 19 is a flow chart of an assembly method of the stator of the motor of FIG. 1.

Step 102: the wire is wound around the winding bracket 11 to form the winding. Referring also to FIG. 19, forming the winding includes the following detailed steps.

Step 1020: the first bracket 111 and the second bracket 112 are rotated relative to each other to facilitate the winding. In this embodiment, the first bracket 111 and the second bracket 112 are rotated to the position where the third insulation plate 1161 is stacked with the first insulation plate 1131, and the two second snap-fit portions 1164 are respectively engaged with the two first snap-fit portions 1134, such that the winding column 1130 of the first bracket 111 and the winding column 1160 of the second bracket 112 are arranged on the same straight line.

Step 1021: one end of a wire is connected to the connecting member 12, for example, by winding the wire on the wire-connecting portion 123 of the connecting member 12. In this embodiment, the wire is wound several turns on the wire-connecting portion 123 to fix the one end of the wire.

Step 1022: the wire is passed through the wire-clamping groove 1135 of the second insulation plate 1132 and wound around the winding column 1130 of the first bracket 111.

Step 1023: the wire is passed through the wire-guiding groove 1165 of the third insulation plate 1161 and then wound around the winding column 1160 of the second bracket 112.

Step 1024: the engagement between the second snap-fit portion 1164 and the first snap-fit portion 1134 is unlocked.

Step 1025: the first bracket 111 and the second bracket 112 are rotated relatively to a position where the first bracket 111 and the second bracket 112 are arranged in parallel with each other.

Step 1026: after passing through the wire-clamping groove 1166, the other end of the wire is connected to the second connecting terminal 131, for example, by winding the wire on the wire-connecting portion 1313 of the second connecting terminal.

Step 1027: the wire is cut off.

Step 103: the circuit board 17 is fixed to the winding bracket 11 and is electrically connected with the connecting member 12 and the first connecting terminal 130, for example, by inserting the connecting portion 127 of the connecting member 12 and the connecting portion 1333 of the first connecting terminal 130 into the two inserting openings 1711 of the circuit substrate 171.

Step 104: the wire wound on the wire-connecting portion 123 of the connecting member 12 is soldered to the wire-connecting portion 123, and the wire wound on the wire-connecting portion 1313 of the second connecting terminal 131 is soldered to the wire-connecting portion 1313, the circuit substrate 171 of the connecting portion 127 of the connecting member 12 are soldered, and the circuit substrate 171 and the connecting portion 1333 of the first connecting terminal 130 are soldered.

Step 105: the winding bracket 11 is mounted on the stator core 14, i.e. the two branches 143 of the stator core 14 are respectively passed through the first bracket 111 and the second bracket 112 and engaged with the connecting portion 144.

The assembled rotor 30 and the base body 50 as a whole is passed through the stator poles 141 of the stator core 14.

The protective cover 70 is placed to cover on the winding bracket 11, the connecting member 12, part of the stator core 14, the winding 16, and the circuit board 17, and is locked with the base body 50. After respectively passing through the two through slots 775, the two connecting terminals 13 are received in the two inserting slots 773.

It should be understood that the assembly sequence may vary in other embodiments. For example, mounting the circuit board 17 at step s103 may be performed after step S105, or before covering of the protective cover 70. During the soldering operation of step 104, soldering the wire to the two wire-connecting portions may be performed immediately after winding around the respective first bracket and the second bracket is completed, or the whole winding is completed, and soldering the circuit substrate 171 may be performed before the protective cover 70 is mounted. When connecting the wire, the wire may be first connected to the connecting wire 12 or, alternatively, may be first connected to the power supply terminals. In assembly of the stator, the winding bracket may not be used. Instead, another insulation member, such as insulation paper or an insulation layer, may be used for insulation purposes.

During the above winding process, the connecting terminals 13 and the connecting member 12 are disposed on the winding bracket 11. Therefore, during the winding process, the wire can be first wound on one of the connecting member 12 and the connecting terminals 13, and then wound around the winding bracket 11, and finally wound around another of the connecting member 12 and the connecting terminals 13 to form the winding 16. Therefore, during this process, the whole winding process and the subsequent soldering process can be performed automatically by existing automation equipment, which greatly reduces the time and cost of manual winding. In addition, during the winding process, two wire-clamping grooves and the wire-guiding groove are used to guide the wire, which further facilitates the automated winding process and results in neater wire arrangement in the finished winding.

In addition, during the assembly process of the stator 10, besides the automated winding process, mounting the circuit board 17 can also be performed automatically. In mounting the circuit board 17, automation equipment can be used to place the circuit board on the winding bracket 11, with the connecting member 12 and the connecting terminals 13 inserted into the circuit board, and then the soldering process is performed, which further realizes the automation of the assembly process.

In another embodiment, the circuit board 17 can be mounted on only the connecting member 12 and the first connecting terminal 130, or mounted on only the winding bracket 11. When the circuit board 17 is mounted on the connecting member 12 and the first connecting terminal 130, or mounted on one end of the winding bracket adjacent the rotor, it is possible to arrange the magnetic sensor 176 adjacent the rotor. It should be understood that, in another embodiment where only the above circuit board mounting manner is desired, other parts of the motor 1 can be the same as in the existing motors, for example, the wire can be wound and connected in a manner different from those described herein in this embodiment, and the base body 50 can be omitted.

The connecting member 12 and the connecting terminals 13 are disposed on the winding bracket 11, the circuit board 17 is electrically connected with the connecting member 12 and the second connecting terminal 131, and two wire ends of the winding are electrically connected with the connecting member 12 and the first connecting terminal 130, respectively. Therefore, it is unnecessary to directly connect the wire ends of the winding to the circuit board 17. This connection structure uses the connecting member and the connecting terminals, which facilitates winding the wire and mounting the circuit board 17 and facilitates achieving automated winding process and circuit board mounting process.

In this embodiment, the two connecting terminals 13 of the motor are disposed at the same end of the winding bracket 11 adjacent the rotor or stator poles. Therefore, the circuit board 17 electrically connected with the second connecting terminal 131 is likewise adjacent the rotor or stator poles, which facilitates disposing the magnetic sensor 176 of the circuit board 17 adjacent the rotor to detect rotation of the rotor. In addition, disposing the two connecting terminals 13 at the same end facilitates the arrangement of other components as well as reducing travel of the automation equipment during the soldering and winding process.

It should be understood that, in another embodiment where it is only desired to dispose the two connecting terminals 13 at the same end adjacent the rotor, other parts of the motor can be the same as in the existing motors, for example, the wire can be wound and connected in a manner different from those described herein in this embodiment, the mounting structure of the circuit board 17 can be configured differently, and the base body 50 can be omitted.

The arrangement of the two connecting terminals 13 in this embodiment is different from that of the existing motors. In the existing motors, the terminals are usually arranged on the two brackets of the winding bracket, while the two connecting terminals 13 in this embodiment are arranged on the same bracket of the winding bracket. As a result, the motor has a compact interior structure, which facilitates the arrangement of other components.

It should be understood that a motor in accordance with another embodiment can include part of the structures of the above embodiment, and other structures can be substituted by existing structures, for example, the winding bracket can be substituted by another insulation structure or another insulation means, and the electronic circuit may include all structures or components of the circuit except for the circuit board.

The embodiments described above are preferred embodiments of the present invention, and should not be used to limit the scope of the present invention in any way. Various other modifications can be apparent to persons skilled in the field without departing from the scope of the invention, and all of such modifications should fall within the scope of the present invention.

The invention claimed is:
1. A stator comprising:
   a stator core;
   a winding wound around the stator core;

a winding bracket disposed between the stator core and the winding, the winding bracket comprising a first bracket and a second bracket arranged in parallel with each other;

an electronic circuit; and a first connecting terminal and a second connecting terminal for supplying power to the winding and the electronic circuit from an external power source, the first and second connecting terminals both mounted on one of the first bracket and the second bracket; wherein the electronic circuit and the winding are connected in series between the first connecting terminal and the second connecting terminal, and wherein the stator further comprises a connecting member disposed on the winding bracket, the connecting member is separately formed and electrically connects the winding to the electronic circuit, the electronic circuit comprises a circuit board, and the circuit board is supported by the connecting member and the first connecting terminal.

2. The stator of claim 1, wherein the first connecting terminal and the second connecting terminal are both mounted on one end of the first bracket or the second bracket.

3. The stator of claim 1, wherein each of the first connecting terminal and the second connecting terminal is separately formed and fixed to the winding bracket.

4. The stator of claim 1, wherein said one of the first bracket and the second bracket comprises a winding portion and an inserting portion disposed at one end of the winding portion, and the first connecting terminal and the second connecting terminal are disposed on the inserting portion.

5. The stator of claim 1, wherein the first connecting terminal and the second connecting terminal are arranged in parallel with and offset from each other.

6. The stator of claim 1, wherein the stator core comprises two opposed stator poles and a U-shaped yoke connecting the two stator poles.

7. A motor comprising:

a rotor; and a stator, comprising:
 a stator core;
 a winding wound around the stator core;
 a winding bracket disposed between the stator core and the winding, the winding bracket comprising a first bracket and a second bracket arranged in parallel with each other;
 an electronic circuit; and
 a first connecting terminal and a second connecting terminal for supplying power to the winding and the electronic circuit from an external power source, the first and second connecting terminals both mounted on one of the first bracket and the second bracket; wherein the electronic circuit and the winding are connected in series between the first connecting terminal and the second connecting terminal,
wherein the stator further comprises a connecting member disposed on the winding bracket, the connecting member is separately formed and electrically connects the winding to the electronic circuit, the electronic circuit comprises a circuit board, and the circuit board is supported by the connecting member.

8. The motor of claim 7, wherein the motor further comprises a protective cover, and the protective cover, the first connecting terminal and the second connecting terminal cooperatively form a power socket.

9. The motor of claim 8, wherein the protective cover defines two inserting slots, and a connecting end of the first connecting terminal and a connecting end of the second connecting terminal are received in the two inserting slots, respectively.

10. The motor of claim 9, wherein the two inserting slots are arranged in parallel with and offset from each other.

11. The motor of claim 7, wherein the circuit board is supported by the first connecting terminal.

12. The motor of claim 7, wherein the electronic circuit comprises a circuit board, the circuit board comprises an edge adjacent to the rotor, the electronic circuit comprises a magnetic sensor perpendicularly disposed on the circuit board, and the magnetic sensor is disposed beside the edge of the circuit board adjacent to the rotor.

13. A single phase permanent magnet synchronous motor comprising:

a permanent magnet rotor; and a stator comprising:
 a stator core comprising two opposed stator poles and a U-shaped yoke connecting the two stator poles;
 a single phase winding wound around the stator core, and
 a winding bracket disposed between the stator core and the winding, the winding bracket comprising a first bracket and a second bracket attached around two branches of the U-shaped yoke;
 an electronic circuit; and
 a pair of power supply terminals for supplying power to the single phase winding and the electronic circuit from an external power source, the pair of power supply terminals both mounted on one of the first bracket and the second bracket; wherein the electronic circuit and the winding are connected in series between the pair of power supply terminals,
wherein the electronic circuit comprises a circuit board, the circuit board comprises an edge adjacent to the rotor, the electronic circuit comprises a magnetic sensor perpendicularly disposed on the circuit board, and the magnetic sensor is disposed beside the edge of the circuit board adjacent to the rotor.

14. The single phase permanent magnet synchronous motor of claim 13, wherein the circuit board is supported by one of the pair of power supply terminals.

15. The single phase permanent magnet synchronous motor of claim 13, wherein the stator further comprises a connecting member disposed on the winding bracket, the connecting member is separately formed and electrically connects the winding to the electronic circuit, the electronic circuit comprises a circuit board, and the circuit board is supported by the connecting member.

* * * * *